US011366582B2

(12) United States Patent
Mo et al.

(10) Patent No.: US 11,366,582 B2
(45) Date of Patent: Jun. 21, 2022

(54) SCREENSHOT CAPTURING METHOD, DEVICE, ELECTRONIC DEVICE AND COMPUTER-READABLE MEDIUM

(71) Applicant: GUANGDONG OPPO MOBILE TELECOMMUNICATIONS CORP., LTD., Guangdong (CN)

(72) Inventors: Boyu Mo, Guangdong (CN); Yue Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/881,878

(22) Filed: May 22, 2020

(65) Prior Publication Data
US 2021/0064222 A1     Mar. 4, 2021

(30) Foreign Application Priority Data
Aug. 29, 2019    (CN) .......................... 201910810348.X

(51) Int. Cl.
    *G06F 3/04845*     (2022.01)
    *G06F 3/0488*     (2022.01)
(52) U.S. Cl.
    CPC ........ *G06F 3/04845* (2013.01); *G06F 3/0488* (2013.01); *G06F 2203/04808* (2013.01)
(58) Field of Classification Search
None
See application file for complete search history.

(56) References Cited

U.S. PATENT DOCUMENTS

| 10,365,758 | B1 | 7/2019 | Smith |
| 2009/0256857 | A1 | 10/2009 | Davidson et al. |

(Continued)

FOREIGN PATENT DOCUMENTS

| CN | 104536658 | 4/2015 |
| CN | 106502538 | 3/2017 |

(Continued)

OTHER PUBLICATIONS

WIPO, English translation of ISR and WO for PCT/CN2020/100893, Sep. 30, 2020.

(Continued)

*Primary Examiner* — Nitin Patel
*Assistant Examiner* — Amen W Bogale
(74) *Attorney, Agent, or Firm* — Hodgson Russ LLP

(57) ABSTRACT

The embodiments of the present disclosure provide a screenshot capturing method, a device, an electronic device and a computer-readable medium, and relate to a field of mobile terminals. The method includes: obtaining a duration of a pressing operation when the pressing operation acting on the touch screen is detected; determining a specified page currently displayed on the touch screen, when the duration reaching a preset duration is determined; obtaining a sliding operation acting on the touch screen, wherein the sliding operation and the pressing operation are successive operations; obtaining a positional relationship between an end point of the sliding operation and the specified page, when the sliding operation ends; determining a screenshot image according to the positional relationship and the sliding operation, and capturing the screenshot image.

12 Claims, 18 Drawing Sheets

(56) References Cited

U.S. PATENT DOCUMENTS

2015/0287391 A1   10/2015  Padgett
2017/0308225 A1* 10/2017  Baek .................... G06F 3/0488

FOREIGN PATENT DOCUMENTS

| CN | 106527935 | | 3/2017 |
|----|-----------|---|--------|
| CN | 106598462 | | 4/2017 |
| CN | 106603829 | | 4/2017 |
| CN | 107145293 | | 9/2017 |
| CN | 107145293 A | * | 9/2017 |
| CN | 107526525 | | 12/2017 |
| CN | 108307036 | | 7/2018 |
| CN | 108733297 | | 11/2018 |
| CN | 108984091 | | 12/2018 |
| CN | 109086113 | | 12/2018 |
| CN | 109213407 | | 1/2019 |
| CN | 109976655 | | 7/2019 |
| WO | 2017161825 | | 9/2017 |

OTHER PUBLICATIONS

SIPO, First Office Action For CN Application No. 201910810348.X, dated Oct. 29, 2020.
European Patent Office, Extended European Search Report for EP Application No. 20190485.1, dated Jan. 29, 2021.
SIPO, Office Action for CN Application No. 201910810348, dated Apr. 7, 2021.
Huang, Travis K., "Investigating User Acceptance of a Screenshot-Based Interaction System in the Context of Advanced Computer Software Learning", 2014 47th Hawaii International Conference on System Science, Dec. 31, 2014.
Sheng-da et al., "A New Method of Design and Implementation of Screen-capture Software", Journal of Harbin University of Science and Technology, Dec. 31, 2009.
Changhong, Wang, "Takes a screenshot of a very long web page", Computer knowledge and technology, Aug. 5, 2019.
IPI, Office Action for IN Application No. 202014026419, dated Aug. 20, 2021.

* cited by examiner

SCREENSHOT CAPTURING METHOD, DEVICE, ELECTRONIC DEVICE AND COMPUTER-READABLE MEDIUM

CROSS-REFERENCE TO RELATED APPLICATION

This application claims priority to Chinese Patent Application No. 201910810348.X, filed Aug. 29, 2019, the entire disclosure of which is incorporated herein by reference.

TECHNICAL FIELD

The present disclosure relates to a field of mobile terminal, and more particularly to a screenshot capturing method, device, electronic device, and computer-readable medium.

BACKGROUND

With the development of science and technology, the use of mobile terminal is becoming more and more widespread, and more and more functions are developed. It has become one of the necessary electronic products in people's daily life. At the same time, people can capture a required screen pictures at any time through the screenshot function of the mobile terminal. However, it has been found in practice that during the screenshot process, the user's operation is tedious and the user experience is not good.

SUMMARY

The present disclosure provides a screenshot capturing method, device, electronic device, and computer-readable medium to improve the above defects.

In a first aspect, the embodiments of the present disclosure provide a screenshot capturing method, which is applied to an electronic device, the electronic device include a touch screen. The method includes: obtaining a duration of a pressing operation when the pressing operation acting on the touch screen is detected; determining a page to be screenshot currently displayed on the touch screen, when the duration reaching a preset duration is determined; obtaining a sliding operation acting on the touch screen, wherein the sliding operation and the pressing operation are successive operations; obtaining a positional relationship between an end point of the sliding operation and the page to be screenshot, when the sliding operation ends; determining a screenshot image according to the positional relationship and the sliding operation, and capturing the screenshot image.

In a second aspect, the embodiments of the present disclosure also provide a screenshot device, which is applied to an electronic device including a touch screen, and the device includes a duration obtaining unit, a page obtaining unit, a sliding obtaining unit, a position obtaining unit and a determination unit. The duration obtaining unit is configured to obtain a duration of a pressing operation when the pressing operation acting on the touch screen is detected. The page obtaining unit is configured to determine a page to be screenshot currently displayed on the touch screen, when the duration reaching a preset duration is determined. The sliding obtaining unit is configured to obtain a sliding operation acting on the touch screen, wherein the sliding operation and the pressing operation are successive operations. The position obtaining unit is configured to obtain a positional relationship between an end point of the sliding operation and the page to be screenshot, when the sliding operation ends. The determination unit is configured to determine a screenshot image according to the positional relationship and the sliding operation, and capture the screenshot image.

In a third aspect, the embodiments of the present disclosure also provide an electronic device, the electronic device includes one or more processors, a memory, a touch screen, and one or more application programs, wherein the one or more application programs are stored in the memory and configured to be executed by the one or more processors, and the one or more program is configured to execute the above method.

In a fourth aspect, the embodiments of the present disclosure also provide a computer-readable medium in which program code is stored, and the program code can be invoked by a processor to execute the above method.

The present disclosure provides a screenshot capturing method, device, electronic device and computer-readable medium. When the user needs to capture a screenshot and press on the touch screen, the electronic device can detect the pressing operation acting on the touch screen, and obtain a duration of the pressing operation. When the duration of the pressing operation reaches a preset duration, a page to be screenshot currently displayed on the touch screen is determined. Then, a sliding operation acting on the touch screen is obtained. At the end of the sliding operation, the positional relationship between the end point of the sliding operation and the page to be screenshot is obtained. A screenshot image can be determined according to the positional relationship and the sliding operation, and the screenshot image can be captured. Therefore, the screenshot image can be determined by the operation of pressing and sliding, the operation of capturing a screenshot can be realized, and the operation is simple and not complicated, the user's experience can be improved.

BRIEF DESCRIPTION OF THE DRAWINGS

In order to explain the technical solutions provided in the embodiments of the disclosure more clearly, the following will give a brief introduction to the drawings needed in the embodiments. It is obvious that the drawings in the following description are only some embodiments of the disclosure. For those skilled in the art, without any creative work, they can also obtain other drawings as be described in accordance with these drawings.

DETAILED DESCRIPTION OF EMBODIMENTS

In order to enable those skilled in the art to better understand the solutions of the present disclosure, the technical solutions in the embodiments of the disclosure will be described clearly and completely below in combination with the drawings in the embodiments of the disclosure.

In the modern information era with a wealth of information, in order to meet the needs of users to quickly save or share information, more mobile terminals are equipped with a screenshot function. In the process of using the mobile terminal equipped with screenshot function, the user can control the mobile terminal to capture the currently displayed image on the screen by touching the physical keys of the mobile terminal or touching the screen of the mobile terminal to save or forward the image to other users.

The current screenshot modes can include page screenshot, area screenshot, and long screenshot. Among them, page screenshot is to capture all of the page currently displayed on the screen of the mobile terminal as a screenshot image, and area screenshot is to select a partial area of the page currently displayed on the screen of the mobile terminal to capture a screenshot. As users' demand for screenshot increases, more users expect to be able to sometimes capture content displayed on more than one screen. For example, when a user browses a web page through a browser, the user will constantly slide on the screen to turn the page in order to browse content of new web pages. In this case, the pages being browsed are usually displayed on more than one screen. If the user wants to capture the contents of the pages being viewed, the function of long screenshot is needed. In addition, when a user opens a document and the document is long and cannot be completely displayed within a screen, the document will be displayed in pages. If the user expects to save all the document content in screenshot, the function of long screenshot is still needed. Understandably, the long screenshot is one that captures content of displaying on more than one screen and generates a picture.

However, the inventor found in the research that the current screenshot modes and the determination modes of screenshot area are diversified, leading to the user's need to adapt to different operation modes according to different screenshot modes. For example, some methods of area screenshot are knuckle tapping, and some mobile terminals use a tray control to obtain the user-defined screenshot modes. These operations are too complicated and the user experience is not good.

Figure 1:
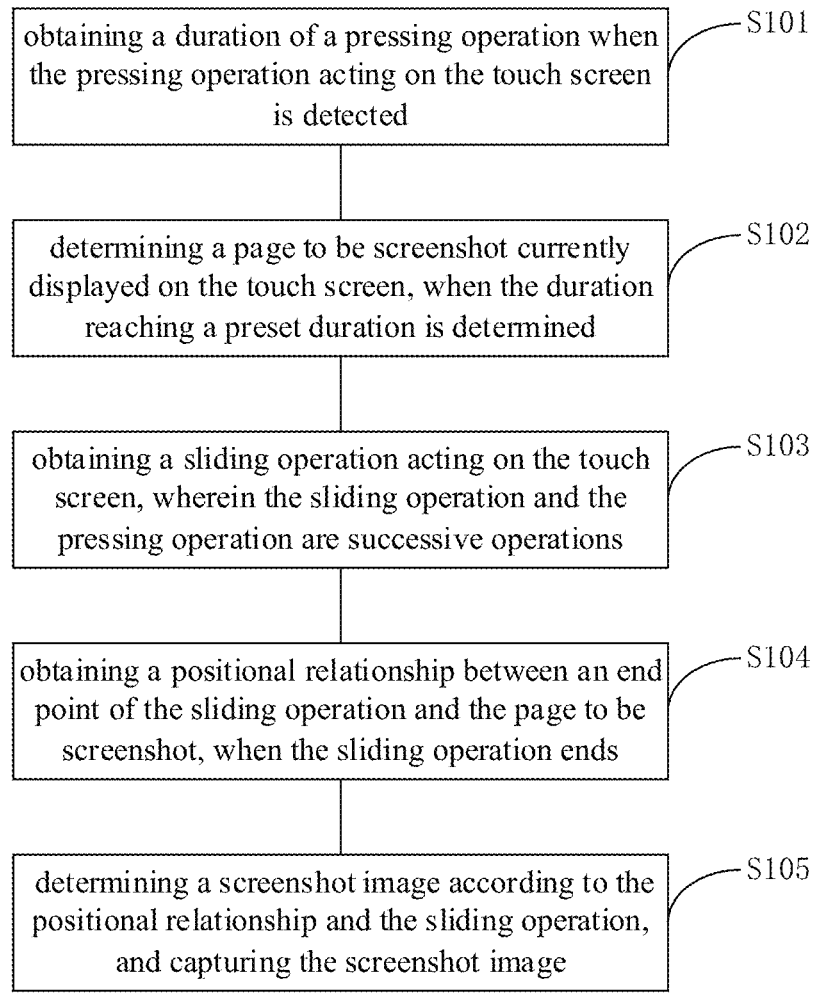
FIG. 1 is a schematic flowchart view of a screenshot capturing method according to an embodiment of the present disclosure.

Therefore, in order to overcome the above defects, please refer to FIG. 1, which shows a screenshot capturing method provided by an embodiment of the present disclosure. The method is applied to an electronic device, and the electronic device includes a touch screen. The method includes operations of S101 to S105.

S101: obtaining a duration of a pressing operation when the pressing operation acting on the touch screen is detected.

In the embodiments, the electronic device can obtain the duration of the pressing operation acting on the touch screen in response to detecting the pressing operation. Specifically, when the user presses the touch screen, the touch screen can detect the pressing operation and output an electric signal corresponding to the pressing operation, so that the processor or operating system in the electronic device can collect the electric signal. When the electric signal greater than a preset value is determined, it is determined that the pressing operation acting on the touch screen is detected. Wherein, the preset value is a value set according to the actual use. If the electric signal is less than the preset value, it is determined that the operation corresponding to the electric signal is not a valid pressing operation, and it is determined that no pressing operation acting on the touch screen is detected.

In addition, at least one touch point corresponding to the pressing operation can be detected to determine whether the distribution information of the at least one touch point meets a specified requirement. Among them, the distribution information includes the number and the positional relationship of the at least one touch point, which will be described in the following embodiments.

When it is determined that the pressing operation is the valid pressing operation, a timing is started to count the duration of the pressing operation. Specifically, when the pressing operation acting on the touch screen is detected, a timer can be started, and the duration of the pressing operation can be counted by the timer.

S102: determining a page to be screenshot currently displayed on the touch screen, when the duration reaching a preset duration is determined.

When the user needs to capture a screenshot, a page is often displayed on the touch screen of the electronic device. The page can be the page that the user is browsing, and the user intends to capture at least part of the content of the page as an image. When it is determined that the duration reaches the preset duration, the electronic device determines that the page currently displayed on the touch screen is the page to be screenshot. In the embodiments, the page to be screenshot is named as specified page, that is, the electronic device can determine a page currently displayed on the touch screen as a specified page in response to determining the duration reaches a preset duration. Specifically, after determining that the duration reaches the preset duration, the electronic device can obtain the displayed content corresponding to the specified page currently displayed on the touch screen, and stops refreshing the content of the page on the screen. For example, taking a video interface as the page, when it is determined that the duration reaches the preset duration, the video content played in the video interface is an image frame corresponding to the playback time of 04:22, and the video interface is in a full screen playback interface, the video cab be paused. That is, stop updating the content of the page and refreshing the content displayed on the page. The video content on the page displayed on the current touch screen is the image frame corresponding to the playback time of 04:22.

S103: obtaining a sliding operation acting on the touch screen, wherein the sliding operation and the pressing operation are successive operations.

The sliding operation corresponds to a sliding track information, which is the position information of multiple touch points that are successive in the sliding time, that is, position information of each touch point corresponds to a moment, and the sliding time is the time period from the beginning to the end of the sliding. Specifically, the starting point of the sliding operation can be a touch point of the pressing operation, and the sliding operation and the pressing operation are successive. That is to say, the specific input method of the sliding operation can be that the user first inputs the pressing operation, that is, after the user presses the touch screen and keeps pressing for the preset duration, slides successively while keeping pressing the screen. That is to say, the starting point of the sliding operation is the touch point corresponding to the pressing operation, the sliding operation and the pressing operation are successive, and the pressing part does not leave the touch screen in the process from the pressing operation to the sliding operation. Wherein, the pressing part is a part of the user for pressing the touch screen.

S104: obtaining a positional relationship between an end point of the sliding operation and the page to be screenshot, when the sliding operation ends.

The end of sliding operation means that the user stops sliding on the touch screen. Specifically, it can be that the pressing part stops sliding on the touch screen and leaves the touch screen, the moment is recorded as the end time of the sliding operation. Therefore, during the sliding time from the beginning to the end time of the sliding operation, the position information of the touch point corresponding to the latest moment is the end point of the sliding operation.

The positional relationship between the end point of the sliding operation and the specified page can be that the end point corresponds to which position point in the specified page, or the end point is in which area of the specified page, or the end point is outside which area of the specified page.

Specifically, the specified page can be divided into multiple areas in advance. The multiple areas include a top area, a bottom area, a left area and a right area. It can also include the area between the top and the bottom, or the area between the left and the right and so on. It is still possible to determine the touch point of the pressing operation that the user acts on the touch screen, that is, the starting point of the sliding operation. Multiple areas can be determined by the starting point, a top, a bottom and two sides of the page. For example, it can be a first area, which is the area between the starting point and the top of the page.

In addition, the positional relationship may also be which of the top, bottom, left side, and right side the end point is close to.

S105: determining a screenshot image according to the positional relationship and the sliding operation, and capturing the screenshot image.

Specifically, the screenshot image can be any one of the images corresponding to the above three screenshot modes. Specifically, the screenshot image can be at least one of image of the page screenshot, image of the area screenshot and image of the long screenshot. Therefore, the specific embodiment of determining the screenshot image according to the positional relationship and the sliding operation can be determining the screenshot mode according to the positional relationship, and determining the screenshot image corresponding to the screenshot mode according to the sliding operation. Then, the screenshot mode can include at least one of the page screenshot, the area screenshot and the long screenshot.

Specifically, the corresponding relationship between the positional relationship and the screenshot mode is preset. As an embodiment, when the screenshot mode is determined to be the area screenshot, the screenshot image corresponding to the area screenshot can be determined according to the sliding operation. As another embodiment, when it is determined that the screenshot mode is the area screenshot or the long screenshot, the screenshot image corresponding to the area screenshot or the long screenshot is determined according to the sliding operation.

For example, the positional relationship is that the end point is located on any one of both sides of the page and the end point is within an area of the page, that is, the end point is located on the page. It can be determined that the screenshot mode corresponding to the positional relationship is the page screenshot, and the image of the whole specified page is used as the screenshot image.

If the screenshot mode corresponding to the positional relationship is the area screenshot, the screenshot area can be determined according to the sliding operation. For example, the area formed by the sliding track corresponding to the sliding operation can be used as the screenshot area, and the area between the starting point and the ending point of the sliding operation can be used as the screenshot area. Specifically, it will be introduced in the following embodiments.

Moreover, if the screenshot mode corresponding to the positional relationship is the long screenshot, the specified page and at least one page after the specified page can be used as the screenshot image. Specifically, a partial image can be determined in the specified page according to the sliding operation, so that the image corresponding to the at least one page after the screenshot page together with the partial image can be used as the screenshot image.

Specifically, the above-mentioned embodiments of determining the screenshot image and capturing the screenshot image according to the positional relationship and the sliding operation will be described in detail in the following embodiments from the perspective of different screenshot modes, and will not be described here.

Figure 2:
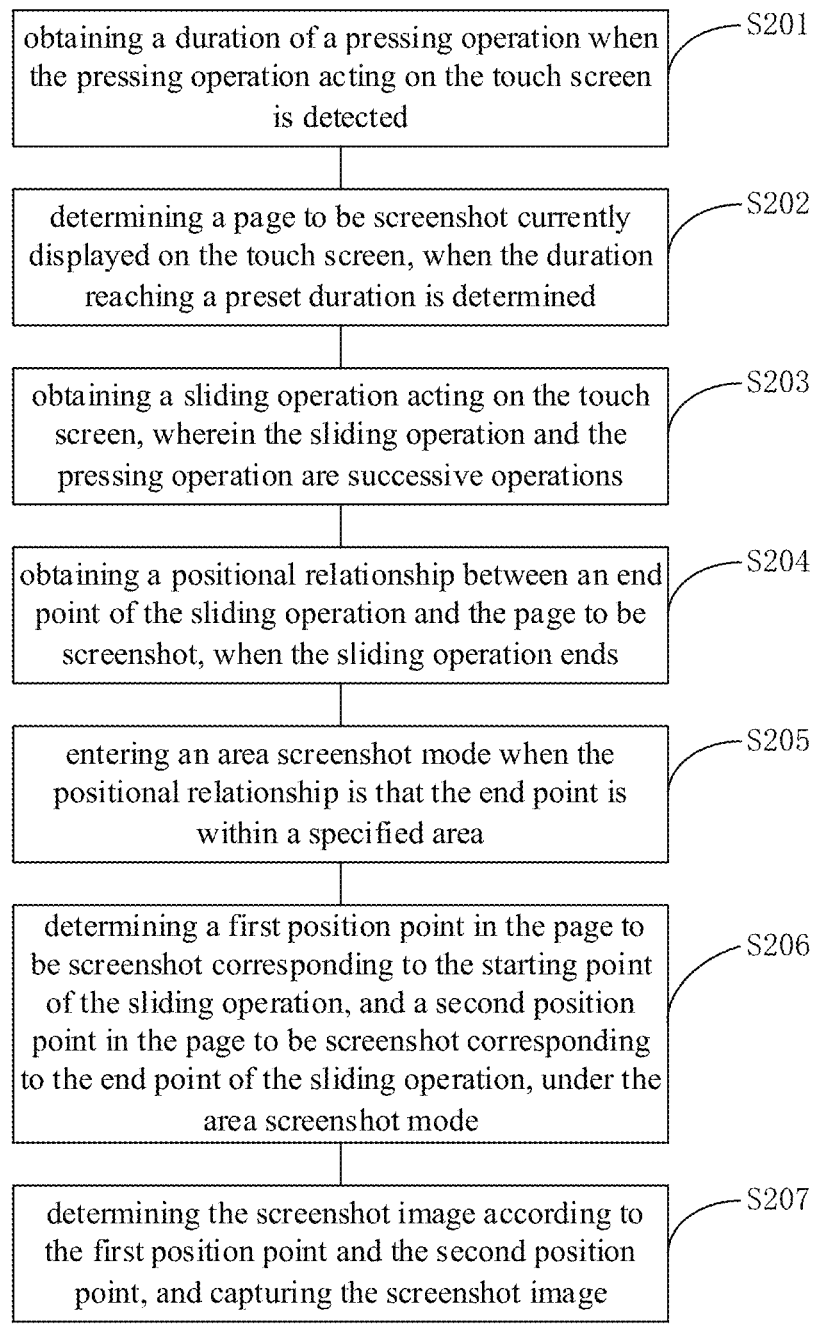
FIG. 2 is a schematic flowchart view of a screenshot capturing method according to another embodiment of the present disclosure.

As shown in FIG. 2, which shows a screenshot capturing method provided by the embodiments of the present disclosure, the method is applied to the electronic device including the touch screen. The method includes operations of S201 to S207.

S201: obtaining a duration of a pressing operation when the pressing operation acting on the touch screen is detected.

S202: determining a page to be screenshot currently displayed on the touch screen, when the duration reaching a preset duration is determined. That is, determining a page currently displayed on the touch screen as a specified page in response to determining the duration reaches a preset duration.

S203: obtaining a sliding operation acting on the touch screen, wherein the sliding operation and the pressing operation are successive operations.

S204: obtaining a positional relationship between an end point of the sliding operation and the page to be screenshot, when the sliding operation ends.

The above operations can refer to the foregoing embodiments, and details will not be described herein again.

In addition, in the embodiments of the disclosure, the pressing operation on the touch screen is generated when the user touches the touch screen using a specific part of the body. Specifically, the specific part can be a user's finger. As an embodiment, the pressing operation refers to a preset number of fingers pressing the touch screen side by side, and the number of the touch points of the sliding operation is consistent with the preset number. The sliding operation refers to a preset number of fingers sliding on the touch screen side by side. Optionally, the preset number can be greater than 1.

Figure 3:
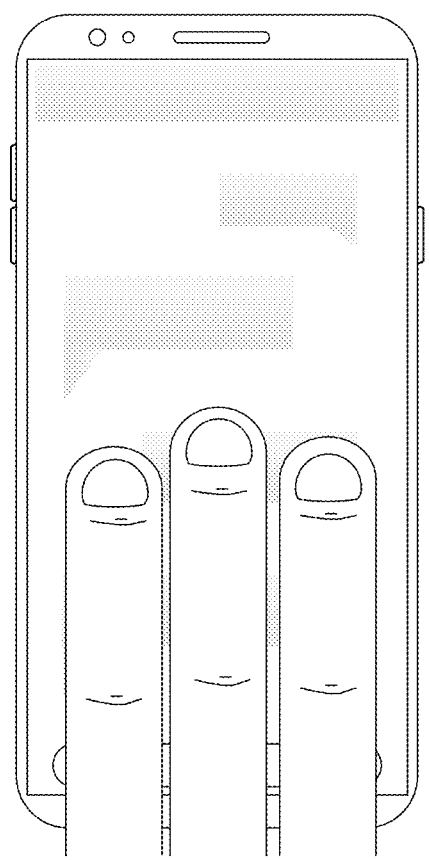
FIG. 3 is a schematic view of a pressing operation according to an embodiment of the present disclosure.

As shown in FIG. 3, the user presses the touch screen side by side with three fingers. For example, the three fingers can be the user's index finger, middle finger and ring finger. The touch screen of the electronic device can detect three touch points (also called as touch point) acting on the touch screen. The positions of the three touch points on the touch screen are respectively a first position coordinate, a second position coordinate and a third position coordinate. Wherein, the position coordinate can be a pixel coordinate of the touch point on the touch screen, and the coordinate system of the pixel coordinate is based on one of the four vertices of the touch screen as the origin of the coordinates. The abscissa of the coordinate system is along the top or bottom of the touch screen of the electronic device, and the ordinate of the coordinate system is along any one of the two sides of the touch screen of the electronic device. After the positions of the three touch points on the touch screen are obtained, the distance between every two adjacent touch points in the three touch points is determined, so as to determine whether the distance between every two adjacent touch points in the three touch points is less than a specified distance. If the distance between two touch points is less than the specified distance, it can be determined that the two touch points are pressed by two fingers in parallel. Thus, when determining the distance between every two adjacent touch points in the three touch points is less than the specified distance, it can be determined that the three fingers are pressed on the touch screen side by side, and then a subsequent operation to obtain the duration of the pressing operation can be performed.

Wherein, obtaining the duration of the pressing operation can be successively obtaining the duration that the user presses the touch screen with the three fingers. Therefore, by detecting a specific number of touch points and a relationship between the distance between every two adjacent touch points and the specified distance, it is possible to avoid the misoperation caused by a user accidentally touching the touch screen.

In the embodiment of the present disclosure, the preset duration can be a value within a range of [0,1] seconds. Specifically, the preset duration is a value within the range of 0.5±0.02 seconds, for example, the preset duration is 0.5 seconds.

After keeping pressing on the touch screen side by side with three fingers for 0.5 seconds, the user keeps pressing the touch screen side by side with the three fingers and sliding on the touch screen, so that the electronic device can obtain the sliding operation acting on the touch screen.

S205: entering an area screenshot mode when the positional relationship is that the end point is within a specified area.

Wherein, the specified area is the area between the top and the bottom of the specified page, that is, the specified area is defined between the top and the bottom of the specified page. When the electronic device detects the end of the sliding operation, the electronic device determines the position information of the end point of the sliding operation on the touch screen, and the position information includes coordinate points of the end point in the pixel coordinate system of the touch screen. The electronic device determines the coordinate points of the bottom and the top of the specified page in the pixel coordinate system of the touch screen, which are respectively recorded as a bottom coordinate and a top coordinate. Then, it is determined whether the end point is between the top and bottom of the specified page according to the coordinate points of the end point, the bottom coordinate and the top coordinate in the pixel coordinate system.

If the end point is in the area between the top and bottom of the specified page, it is determined that the sliding operation does not move out of the specified page, so as to determine that the screenshot mode is the area screenshot.

S206: determining a first position point in the page to be screenshot corresponding to the starting point of the sliding operation, and a second position point in the page to be screenshot corresponding to the end point of the sliding operation, under the area screenshot mode.

After entering the area screenshot mode, it is necessary to determine the first position point and the second position point, wherein the first position point is a position point corresponding to the starting point of the sliding operation in the specified page. Specifically, the electronic device can obtain the coordinate points of the starting point (that is, the touch point of the pressing operation) in the pixel coordinate system, and a position point in the page corresponding to the coordinate points can be searched for as the first position point according to the coordinate points. Also, the second position point can be obtained by the same method.

S207: determining the screenshot image according to the first position point and the second position point, and capturing the screenshot image.

After obtaining the first position point and the second position point, an area can be determined as the screenshot area according to the first position point and the second position point. An image in the screenshot area of the specified page is the screenshot image. The way to determine the screenshot area is to determine a boundary line at the first position point and another boundary line at the second position point. The area between the two boundary lines is the screenshot area. Wherein, the boundary line can be parallel to the top or the bottom of the touch screen.

Specifically, in order to enable the user to see the size of the screenshot area more intuitively, a selection box can be displayed on the touch screen, and the size of the selection box is changed as the sliding operation moves.

Figure 4:
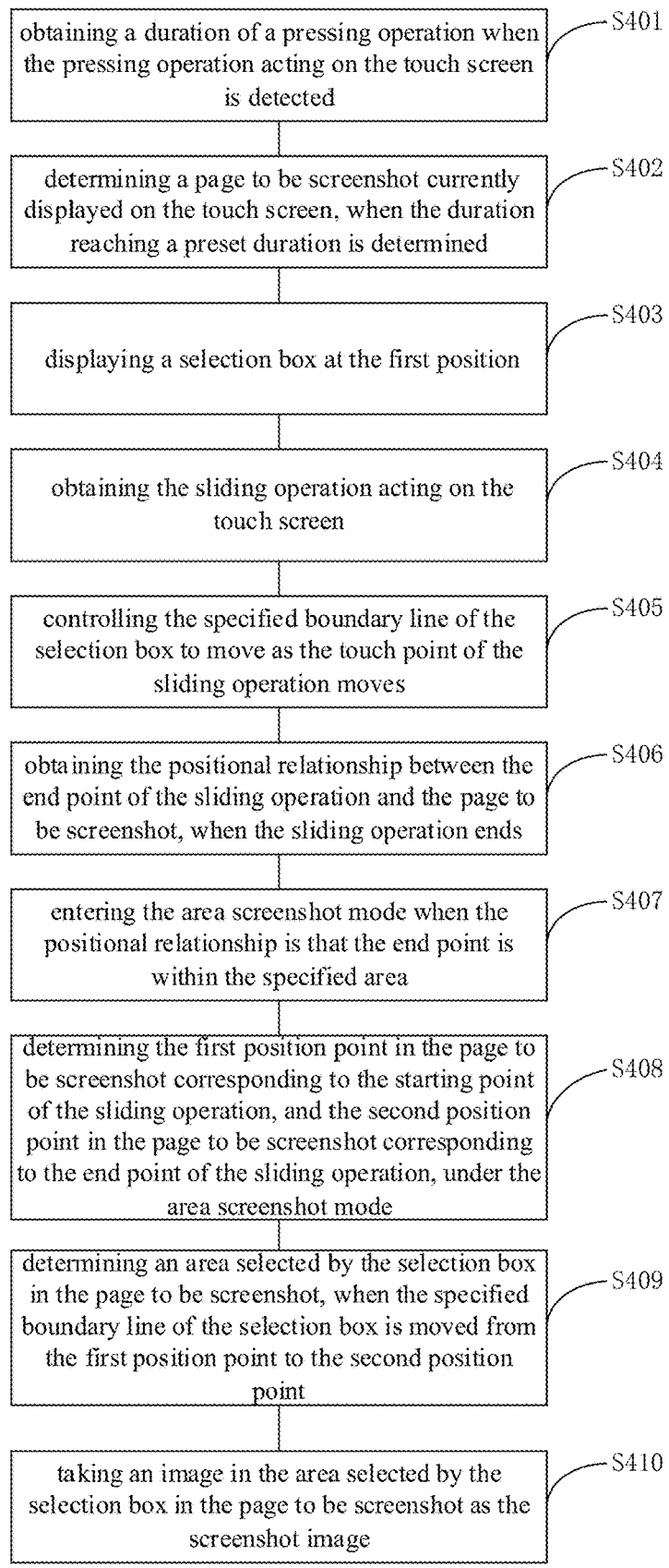
FIG. 4 is a schematic flowchart view of a screenshot capturing method according to another embodiment of the present disclosure.

Please refer to FIG. 4, which shows a screenshot capturing method provided by the embodiments of the present disclosure. The method is applied to the electronic device including a touch screen. The method includes operations of S401 to S410.

S401: obtaining a duration of a pressing operation when the pressing operation acting on the touch screen is detected.

S402: determining a page to be screenshot currently displayed on the touch screen, when the duration reaching a preset duration is determined.

S403: displaying a selection box at the first position.

Figure 5:
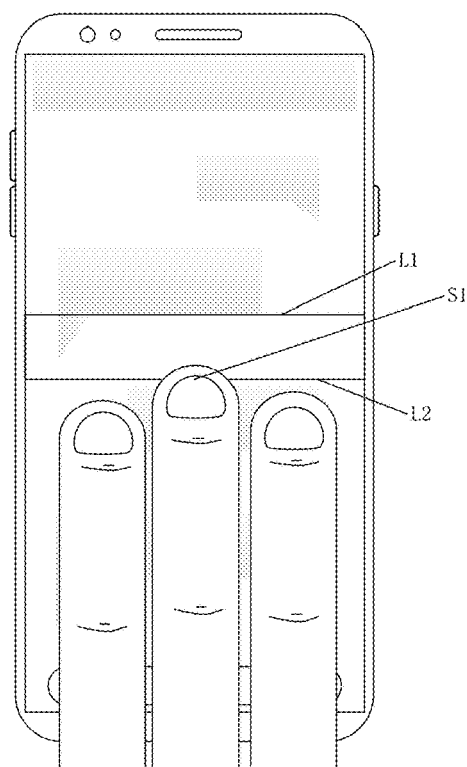
FIG. 5 shows a schematic view of a selection box according to an embodiment of the present disclosure.

The first position point is in the specified page and corresponding to the starting point of the sliding operation, or in the specified page and corresponding to the touch point of the pressing operation. As shown in FIG. 5, S1 is the first position point in FIG. 5. As an embodiment, the pressing operation refers to three fingers pressing the touch screen side by side, and the number of touch points of the sliding operation is three, that is, the sliding operation is the sliding of three fingers side by side on the touch screen. Therefore, the pressing operation is the pressing of three fingers on the touch screen, there are three touch points corresponding to the three fingers. In the direction from the top to the bottom of the touch screen, one of the three touch points which is closest to the top is selected as the target touch point, and the position point corresponding to the target touch point is determined as the first position point. Of course, the touch point closest to the bottom can also be determined as the target touch point. In the embodiments of the present disclosure, the touch point closest to the top is selected as the target touch point.

Specifically, the coordinate points of each touch point in the pixel coordinate system of the touch screen are determined, and the highest point on the ordinate axis is selected as the target touch point. As shown in FIG. 5, if the user presses the touch screen with the index finger, the middle finger and the ring finger, the touch point corresponding to the middle finger is closest to the top, the touch point corresponding to the middle finger is selected as the target touch point. The position point S1 in the specified page pressed by the middle finger is the first position point.

Specifically, the geometric center of the selection box is located at the first position point, or the first position point is located on a boundary line of the selection box. As an embodiment, the selection box is a rectangular box, and a long side of the selection box is consistent with a width of the page, and a specified boundary line of the selection box is the long side of the selection box near the bottom or the top of the touch screen. As shown in FIG. 5, the selection box includes two long sides, the two long sides are a first long side L1 and a second long side L2, respectively. The specified boundary line can be the second long side L2, that is, the long side near the bottom. It can be seen from FIG. 5 that the first position point S1 is located on the second long side L2.

In addition, when the first position point is determined, the current position of the selection box is also recorded by the electronic device, that is, the positions of other boundary lines and vertices of the selection box are recorded by the electronic device. As shown in the rectangular box in FIG. 5, the position of the first long side L1 is also obtained by the electronic device.

Figure 6:
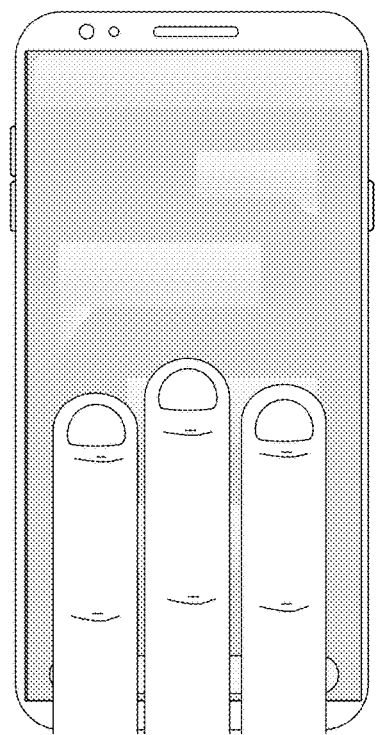
FIG. 6 shows a schematic view of a mask according to an embodiment of the present disclosure.
Figure 7:
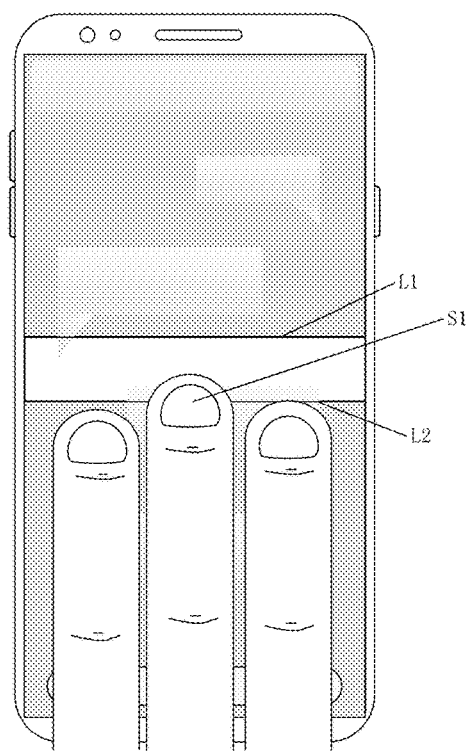
FIG. 7 shows a schematic view of a selection box according to another embodiment of the present disclosure.

Moreover, in order to facilitate the user to view the area selected by the selection box, the specified page can be displayed as a mask. As shown in FIG. 6, when the duration reaching the preset duration is determined, the specified page can be displayed as a mask. Specifically, taking the preset duration of 0.5 seconds as an example, after the user presses on the touch screen with three fingers simultaneously for 0.5 seconds, the touch screen displays the mask, which is the mask of the specified page, and a rectangular selection box is generated at the first position point where the finger touches the touch screen, as the page shown in FIG. 7. Specifically, the second long side L2 of the rectangular selection box is located at the position point S1, the selected area at this time is the area where the outline of the selection box and the page intersect. As shown in FIG. 7, the selection box is the rectangular selection box and the length of the rectangular selection box is equal to the length of the page. As an embodiment, the mask is not used in the selection box. Then, as shown in FIG. 7, the inner part of the selection box is not masked, and the outer part of the check box is masked, so that the selected area and the unselected area can be clearly seen.

S404: obtaining the sliding operation acting on the touch screen.

S405: controlling the specified boundary line of the selection box to move as the touch point of the sliding operation moves.

Figure 8:
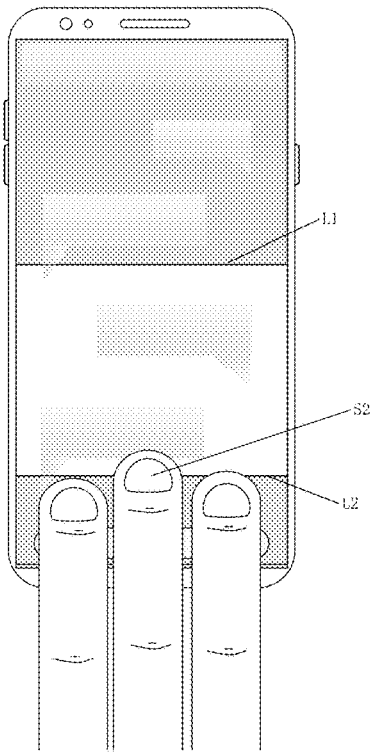
FIG. 8 shows a schematic view of a selection box according to another embodiment of the present disclosure.

Specifically, since the sliding operation and the pressing operation are successive, and the starting point of the sliding operation is the touch point corresponding to the pressing operation, the sliding operation is the movement of the touch point on the touch screen. The specified boundary line of the selection box can be controlled to move as the touch point moves. As shown in FIG. 8, the specified boundary line is the second long side L2, and the second long side L2 moves with the movement of the touch point from the position S1 to the position S2, while the position of the first long side L1 can remain unchanged.

S406: obtaining the positional relationship between the end point of the sliding operation and the page to be screenshot, when the sliding operation ends.

S407: entering the area screenshot mode when the positional relationship is that the end point is within the specified area.

S408: determining the first position point in the page to be screenshot corresponding to the starting point of the sliding operation, and the second position point in the page to be screenshot corresponding to the end point of the sliding operation, under the area screenshot mode.

S409: determining an area selected by the selection box in the page to be screenshot, when the specified boundary line of the selection box is moved from the first position point to the second position point.

As shown in FIG. 8, the second position point in the specified page corresponding to the end point of the sliding operation is S2 in FIG. 8. The specific embodiment of determining the area selected by the selection box in the specified page when the specified boundary line of the selection box is moved from the first position point to the second position point can be as follows. The first position point is located at the specified boundary line, and all position points located at the specified boundary line in the pixel coordinate system are recorded as a set of initial position points. When the second position point is located at the specified boundary line, all position points located at the specified boundary line in the pixel coordinate system are recorded as a set of end position points. The area formed by all position points between the set of initial position points and the set of end position points on the specified page is determined as the area selected by the selection box.

As shown in FIG. 8, the selection box is a rectangular selection box, and the specified boundary line is the second long side L2. A first ordinate of the first position point and a second ordinate of the second position point can be determined, and the area formed by the position points which ordinates are located between the first ordinate and the second ordinate on the specified page is marked as the area selected by the selection box.

S410: taking an image in the area selected by the selection box in the page to be screenshot as the screenshot image.

Specifically, the area selected by the selection box includes a first sub-area and a second sub-area. The first sub-area is selected by the selection box at the beginning of the sliding operation, as shown in FIG. 7. The second sub-area is formed by the specified boundary line moving from the first position point to the second position point when the sliding operation ends, that is, the second sub-area is formed by the specified boundary line corresponding to the first position point and the specified boundary line corresponding to the second position point. As the area from S1 to S2 shown in FIG. 8, the sum of the first sub-area and the second sub-area is the area selected by the selection box.

Figure 9:
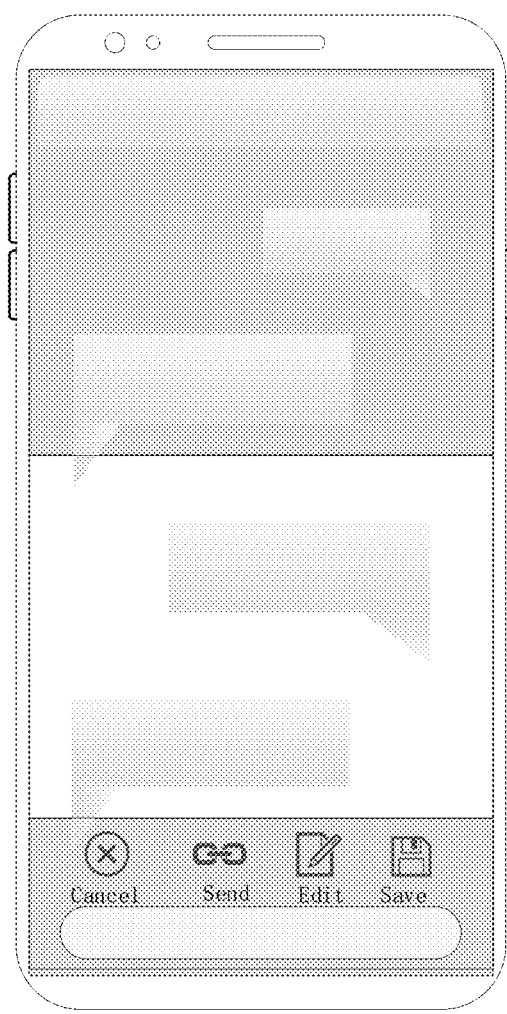
FIG. 9 shows a schematic view of an area screenshot determination interface according to another embodiment of the present disclosure.

At the end of the sliding operation, an area screenshot determination interface is displayed. As shown in FIG. 9, the specified page, the selection box and operation buttons, such as a cancel button, a sending button, an edit button and a save button, are displayed on the interface. Wherein, if the user inputs the cancel instruction based on the cancel button, the electronic device cancels the screenshot operation in response to the cancel instruction. If the user input a sending instruction based on the sending button, the electronic device sends the screenshot image to a target user specified by the user in response to the sending instruction. If the user inputs an editing instruction based on the editing button, the electronic device obtains the editing data input by the user in response to the editing instruction, and modifies the screenshot image based on the editing data. Specifically, a modification instruction of the selection box area input by the user is obtained, and the size of the selection box is modified according to the modification instruction of the selection box area; the image in the area selected by the modified selection box in the specified page is taken as the screenshot image. Specifically, the user can operate the boundary line of the selection box, and move the boundary line to modify the selection box area. The modification instruction of the selection box area includes a position of at least one boundary line of the selection box area after the at least one boundary line is moved.

In addition, it should be noted that the shape of the selection box cannot be limited to a rectangle, but any other shape, or even a straight line (the upper and lower sides of the selection box coincide). It is also possible to trigger backward sliding to the top of the touch screen for the area screenshot in another direction. Specifically, the specified boundary line may be one of the boundary lines of the selection box which closet to the top of the touch screen, for example, the first long side L1 of the rectangular selection box is the specified boundary line.

Figure 10:
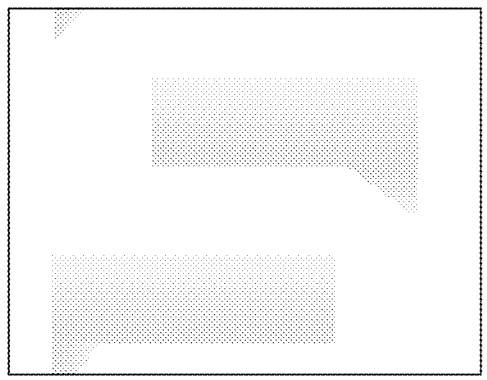
FIG. 10 shows a schematic view of a screenshot image according to an embodiment of the present disclosure.

Specifically, the image corresponding to the area selected by the selection box is captured in the specified page, as shown in FIG. 10, which shows the screenshot image. Comparing with FIG. 8, it can be seen that the screenshot image is the image corresponding to the area selected by the selection box when the specified boundary line is moved from the first position point to the second position point in FIG. 8.

Figure 11:
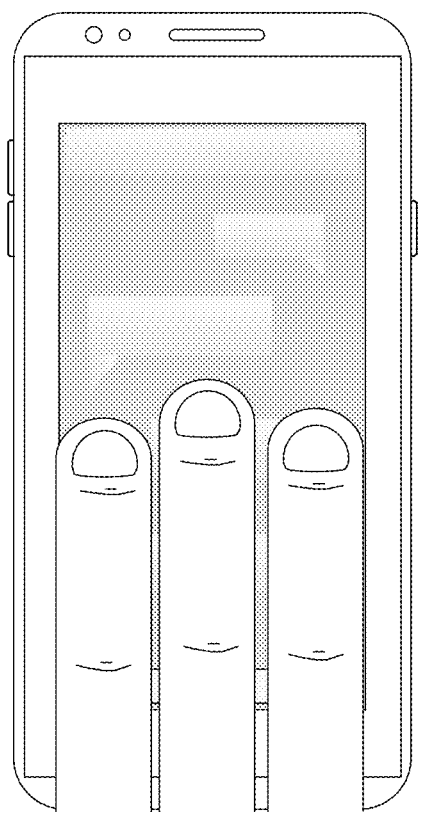
FIG. 11 shows a schematic view of an interface to be screenshot according to an embodiment of the present disclosure.

Moreover, in order to allow the user to more intuitively observe the positional relationship between the touch point in the sliding gesture input by the user and the specified page, the specific embodiments of determining the specified page currently displayed on the touch screen when the duration reaching a preset duration is determined can be as follows. When the duration reaching a preset duration is determined, a size of the page current displayed on the touch screen is reduced and the reduced page displayed, and the reduced page is the specified page currently displayed. That is, the specified page is an interface with reduced size. As shown in FIG. 11, the size of the page currently displayed on the touch screen is smaller than the size of the touch screen, and the user can more intuitively see whether the user's finger is located in the specified page.

Therefore, the user can press the touch screen with three fingers, after the selection box appears, the fingers do not leave the touch screen and slide down successively, and the bottom line of the selection box will move down with the fingers. At this time, when the finger is released, and the position where the sliding operation ends is still in the page, the area of the page selected by the selection box is the result of the area screenshot, that is, the screenshot image.

Figure 12:
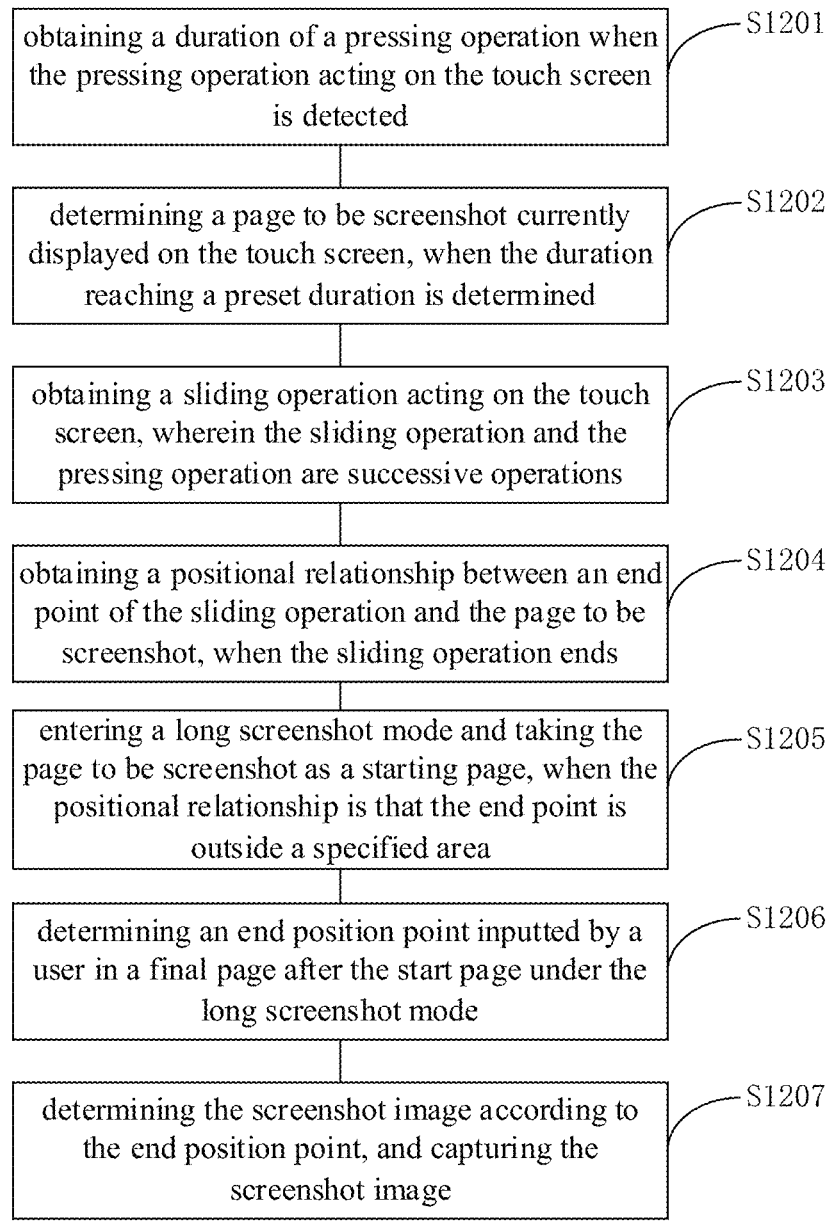
FIG. 12 is a schematic flowchart view of a screenshot capturing method according to another embodiment of the present disclosure.

Please refer to FIG. 12, which shows a screenshot capturing method provided by the embodiments of the present disclosure. The method is applied to the electronic device including the touch screen. The method includes operations of S1201 to S1207.

S1201: obtaining a duration of a pressing operation when the pressing operation acting on the touch screen is detected.

S1202: determining a page to be screenshot currently displayed on the touch screen, when the duration reaching a preset duration is determined.

S1203: obtaining a sliding operation acting on the touch screen, wherein the sliding operation and the pressing operation are successive operations.

S1204: obtaining a positional relationship between an end point of the sliding operation and the page to be screenshot, when the sliding operation ends.

S1205: entering a long screenshot mode and taking the page to be screenshot as a starting page, when the positional relationship is that the end point is outside a specified area.

Wherein, the specified area is the area between the top and the bottom of the specified page.

As an embodiment, the end point is within the specified area, which means that the end point is located at the top, or at the bottom, or between the bottom and the top. While the end point is outside the specified area, it can be outside the bottom or the top, that is, the end point is outside the page. At this time, the specified page is the reduced page after the size of the page displayed on the touch screen is reduced, that is, when it is determined that the duration reaches the preset duration, the size of the page currently displayed on the touch screen is reduced and the reduced page is displayed, and the reduced page is the specified page currently displayed on the touch screen.

As another embodiment, a display size of the specified page is consistent with a display size of the touch screen, and the specified page includes a top edge and a bottom edge. When a distance between the end point and the top edge is less than a specified distance, or a distance between the end point and the bottom edge is less than the specified distance, the end point is determined outside the specified area. For example, the end point is on the edge of the bottom, it is determined that the end point slides out of the bottom.

In addition, in order to reduce the complexity and operation continuity of the user's to operate the area screenshot and long screenshot, in the embodiments, the method corresponding to FIG. 4 is adopted. The selection box is displayed at the first position point in the specified page corresponding to the starting point of the sliding operation, when it is determined that the duration reaches the preset duration. The specified boundary line of the selection box is controlled to move as the touch point of the sliding operation moves.

If the ending point is within the specified area, for example, the ending point is not slid out of the bottom of the specified page, enter the area screenshot mode, and use the above area screenshot mode to capture the screenshot image.

Figure 13:
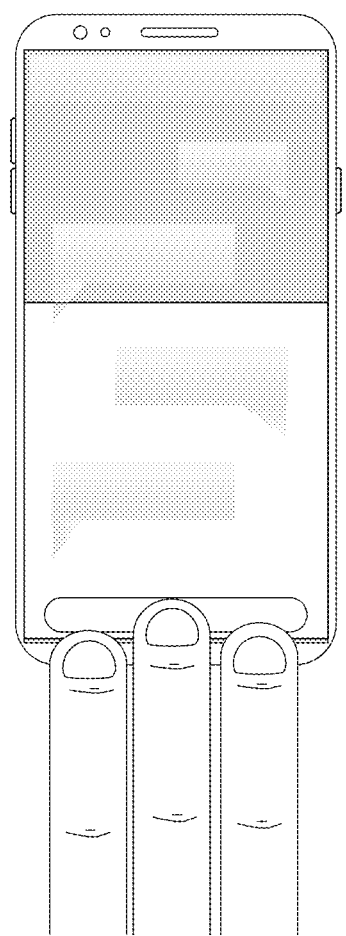
FIG. 13 shows a schematic view of a selection box according to another embodiment of the present disclosure.
Figure 14:
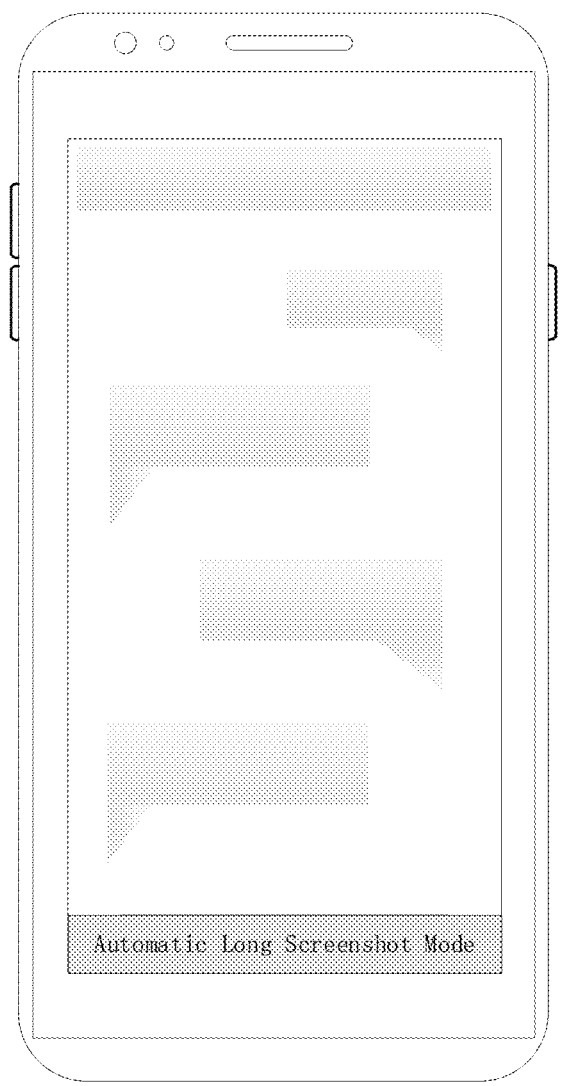
FIG. 14 shows a schematic view of a long screenshot operation interface according to an embodiment of the present disclosure.

If the end point is outside the specified area, as shown in FIG. 13, the user's finger has touched the bottom edge of the page, and slide out of the bottom of the specified page, the electronic device enters the long screenshot mode and displays the long screenshot operation interface, as shown in FIG. 14, which shows the long screenshot operation interface.

S1206: determining an end position point inputted by a user in a final page after the start page under the long screenshot mode.

Under the long screenshot mode, part or all of the current specified page is selected, and the user can turn the page. Turn the page is to display the page after the specified page by sliding the page. A page is determined as the final page among the pages after the specified page, and an end position is determined within the final page. The end position is determined as the end position point.

Figure 15:
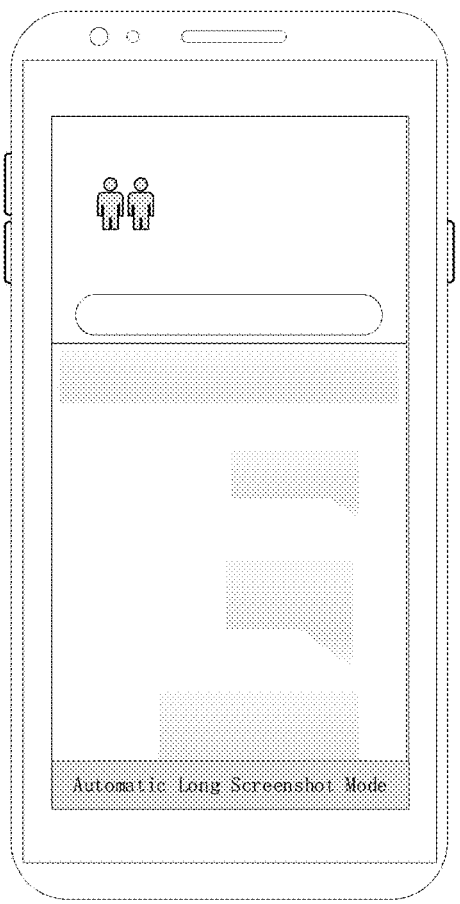
FIG. 15 shows a schematic view of a long screenshot operation interface according to another embodiment of the present disclosure.

As an embodiment, a selection box of a long screenshot area can be displayed in the long screenshot operation interface. When the electronic device enters the long screenshot mode after S1205 is executed, the selection box of the long screenshot area can select the entire page of the specified page. Then, the top side of the selection box of the long screenshot area is determined as the starting of the long screenshot area, and the bottom side of the selection box of the long screenshot area is determined as the end of the long screenshot area. The user can slide the page in the long screenshot operation interface, so as to slide the at least one page after the specified page into the selection box of the long screenshot area. When the user stops sliding, the position point of the page on the bottom side of the selection box of the long screenshot area is determined as the end position in the final page, the end position is determined as the end position point. As shown in FIG. 15, there are two pages displayed in the selection box of the long screenshot area, wherein, the lower page is the final page, and the position on the bottom side of the selection box of the long screenshot area corresponding to the end position in the final page. For example, if the specified page is a chat history page, the specified page is a first page, and the final page is a third page, then the position of the final page is a position within the third page.

Figure 16:
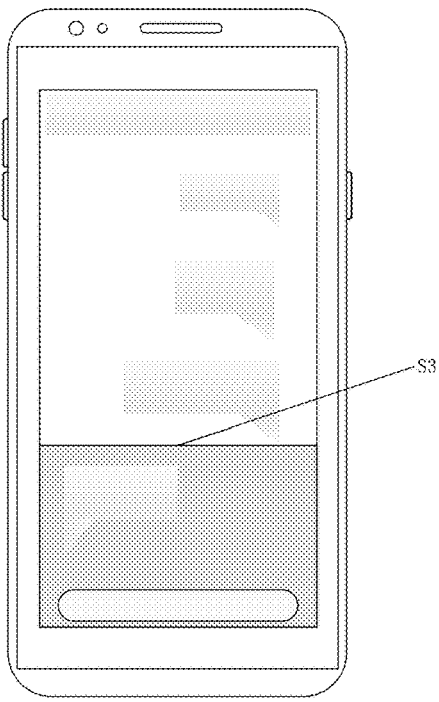
FIG. 16 shows a schematic view of an end position according to an embodiment of the present disclosure.

As another embodiment, the bottom side of the selection box of the long screenshot area can be moved, that is, the user can drag the bottom side of the selection box of the long screenshot area to slide down, and at the same time, the page after the specified page is displayed. The position where the bottom side of the selection box of the long screenshot area stops is the end position, the end position is determined as the end position point, and the page corresponding to the end position is the final page, as shown in FIG. 16, S3 is the end position, which is located in the final page.

S1207: determining the screenshot image according to the end position point, and capturing the screenshot image.

Wherein, the end position point is a position point in the final page, which is used to represent the end position of the screenshot area under the long screenshot mode. The screenshot area can be determined according to the page where the user start to input the sliding operation (that is, the specified page) and the end position on the final page after the specified page, and the screenshot image can be determined and captured.

Specifically, the screenshot image can be determined according to the positions of the starting point and the end point. The specific embodiment of determining the screenshot image according to the end position point can be: determining a starting position point in the starting page, and taking all images between the starting position point in the starting page and the end position point in the final page as the screenshot image.

Wherein, the starting page is the specified page, wherein the duration of the pressing operation is obtained when the pressing operation acting on the touch screen is detected, and the specified page currently displayed on the touch screen is determined when the duration reaching the preset duration is determined. That is, the starting page is the page where the starting point of the sliding operation is located. A starting position can correspond to the top of the starting page. Specifically, when entering the long screenshot mode, the starting position is determined as the top position of the starting page, the starting position is determined as the starting position point. As an embodiment, the top side of the selection box of the long screenshot area is located at the top edge of the starting page, that is, the screenshot image under the long screenshot mode includes the entire page of the starting page. The method for determining the screenshot image is to take all the images between the starting position point in the starting page and the ending position point of the final page as the screenshot image.

Figure 17:
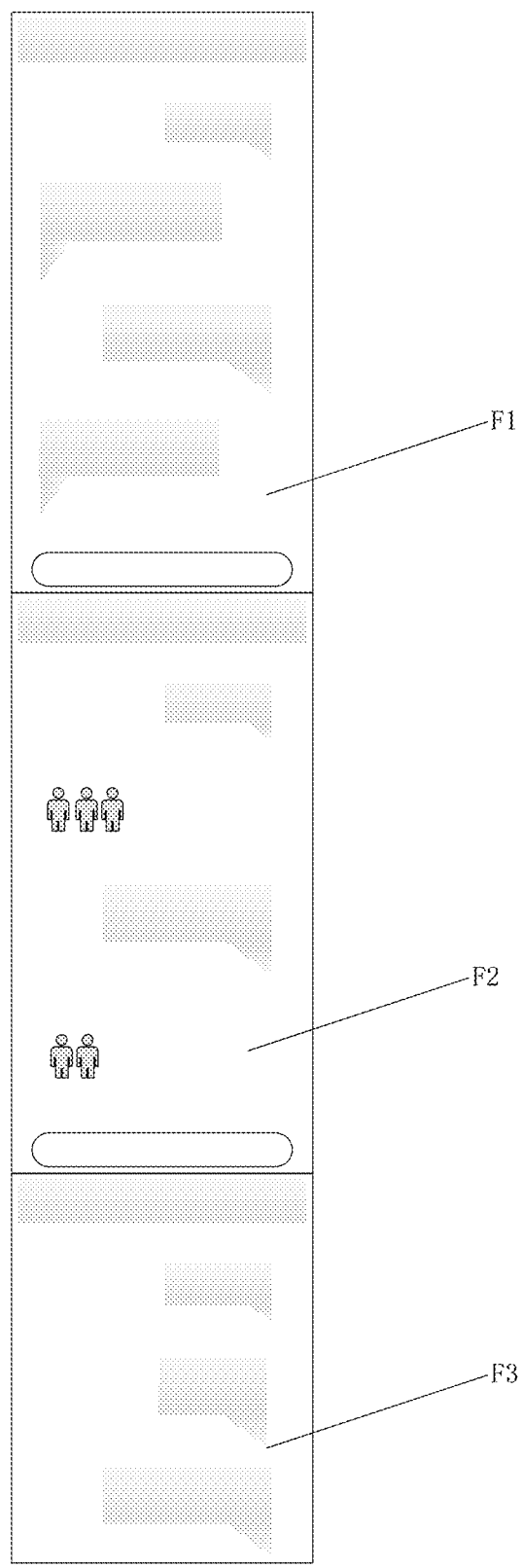
FIG. 17 shows a schematic view of a screenshot image according to another embodiment of the present disclosure.

The screenshot image includes three parts, namely a first image, a second image and a third image. Wherein the first image corresponds to the entire of the specified page, the second image corresponds to all pages between the specified page and the final page, and the third image corresponds to the area between the top edge and the end position in the final page. The first image, the second image and the third image are combined into the screenshot image in sequence. As shown in FIG. 17, F1 is the first image which is the image of the entire of the starting page, F2 is the second image, which is the image corresponding to the page between the starting page and the final page, and F3 is the image corresponding to the area between the top edge and the end position in the final page. Comparing with FIG. 16, it can be seen that the third image is the image between the end position S3 and the top edge of the page shown in FIG. 16.

As another embodiment, the starting position is the position point where the user inputs the touch point corresponding to the pressing operation, and the specific embodiments of determining the screenshot image according to the end position point and capturing the screenshot image can include: determining the starting position point in the starting page corresponding to the starting point of the sliding operation; taking all images between the starting position point in the starting page and the end position point in the final page as the screenshot image.

Figure 18:
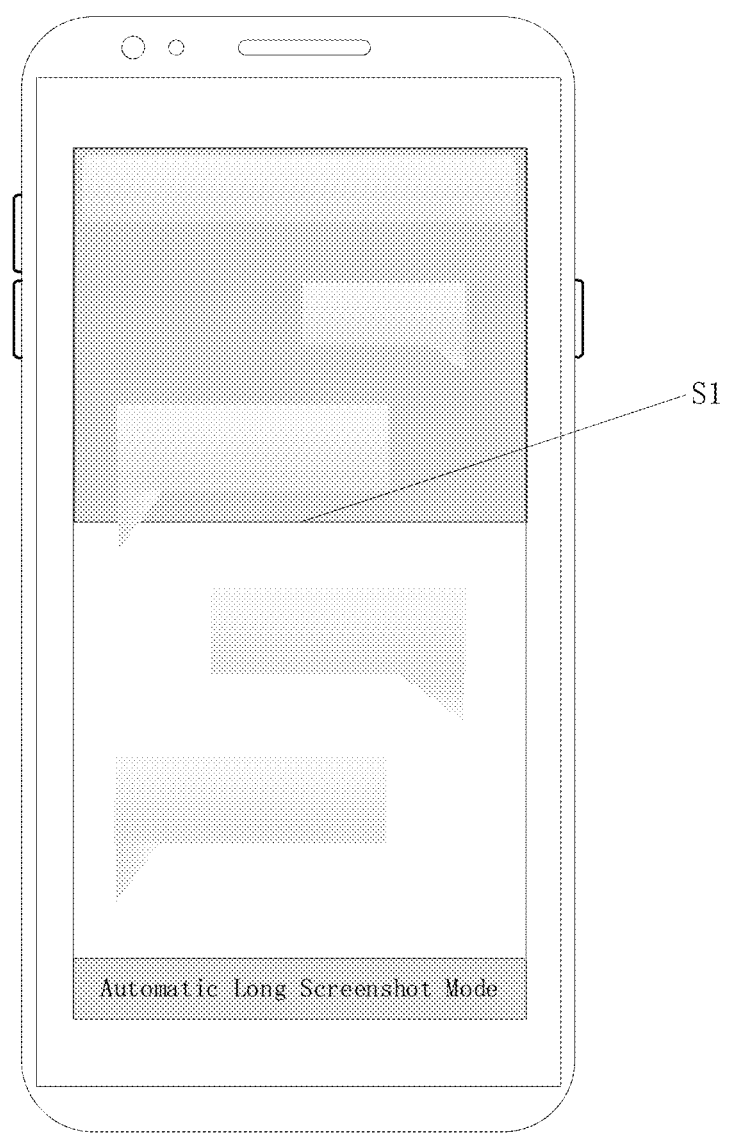
FIG. 18 shows a schematic view of a starting position according to an embodiment of the present disclosure.
Figure 19:
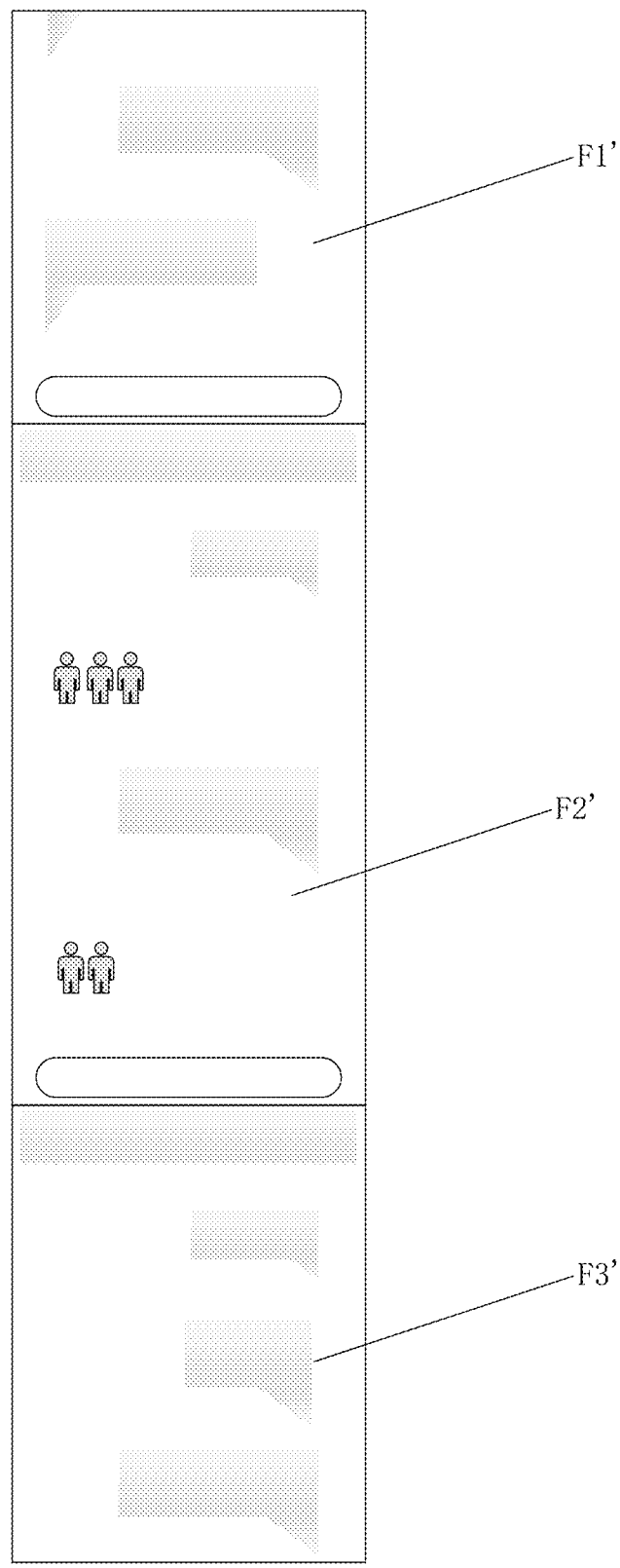
FIG. 19 shows a schematic view of a screenshot image according to another embodiment of the present disclosure.

The specific embodiment of determining the starting position point in the starting page corresponding to the starting point of the sliding operation can refer to the foregoing embodiment, which will not be described here. As shown in FIG. 18, when the long screenshot mode is determined and the long screenshot operation interface is displayed on the touch screen, the selection box of the long screenshot area is displayed on the long screenshot operation interface, and the top side of the selection box of the long screenshot area is located at a position corresponding to the starting point of the sliding operation, so that the starting point of the long screenshot area is the starting point of the sliding operation. As shown in FIG. 19, it can be seen that a first image F1' is an image corresponding to the area between the position in the starting page corresponding to the starting point of the sliding operation and the bottom side of the starting page, which is consistent with the area corresponding to the selection box of the long screenshot area in FIG. 18. While a second image F2' and a third image F3' can refer to the second image F2 and the third image F3 in FIG. 17, respectively.

In addition, after the screenshot image is captured under the long screenshot mode, a long screenshot determination interface shown in FIG. 9 can be displayed similar to the area screenshot, in which the user can perform operations such as cancel, send, edit and save.

With reference to the above method embodiments, it can be seen that the starting mode of the area screenshot and the long screenshot can both be entered according to the sliding operation after obtaining the pressing operation acting on the touch screen and the duration of the pressing operation reaches the preset duration. Specifically, as an embodiment, the user presses the touch screen and keeps the duration of pressing operation reaching the preset duration, and slide the touch point successively. Take sliding toward the bottom of the touch screen as an example, if the user finishes the sliding operation, that is, when the fingers leave the touch screen, the end point of the sliding operation does not slide out the bottom of the specified page, the area screenshot can be determined and the area screenshot mode is entered. If the sliding operation slides out the bottom of the specified page, the long screenshot can be determined and the long screenshot mode is entered.

Specifically, the system of the electronic device can detect the state that the user's three fingers touch the touch screen, and after a certain period of time, the system can be brought into a specific state. Then, by obtaining the coordinates of each finger on the touch screen, the situation that may be touched by mistake is excluded. For example, it is determined whether the number of touch points is three and whether the positional relationship of the three touch points is side-by-side or adjacent. If it is not the situation of touch by mistake, the coordinate point with the highest ordinate in the three finger coordinates is taken as the position where the selection box appears. The specific embodiment is that the ordinate of the bottom of the selection box is the ordinate of the highest finger, and the width of the selection box is a preset length and can be configured by code. For example, the width of the selection box can be the same as the width of the specified page, or can be smaller than the width of the specified page, and the user can adjust the width of the selection box. For example, the user moves three fingers to two sides of the touch screen when pressing the touch screen, so as to adjust the width of the selection box. The bottom edge responds to the sliding distance of the fingers in real time to adjust the size of the selection box, to achieve a consistent area screenshot effect. Similarly, the system can be triggered to enter the long screenshot mode by detecting that the coordinates of three fingers are beyond the bottom of the touch screen.

Therefore, through the positional relationship between the end point of sliding operation and the specified page, different screenshot modes can be entered. The gestures of the user selecting area screenshot and long screenshot are similar and related, and which is convenient for the user to operate. The user can quickly and consistently perform area screenshot or long screenshot operation, which improves the user's experience and indirectly improves the user's recognition of the operating system of the electronic device.

Furthermore, the above sliding operation can also be used to make the electronic device enter the page screenshot mode. Specifically, the electronic device can detect the sliding operation input by the user, and determine whether the sliding direction of the sliding operation satisfies a preset condition. If it is satisfied, the page screenshot mode is entered, that is, the image corresponding to the entire currently displayed page is taken as the screenshot image. For example, the sliding direction and sliding distance can be sliding toward the bottom of the touch screen, so that when the user slides down with three fingers, the electronic device can enter the page screenshot mode. Therefore, there is a certain correlation between the way to enter the page screenshot mode and the ways to enter the area screenshot mode and the long screenshot mode. Without pressing the touch screen and holding it for a certain period of time, the user can directly use the side by side three fingers to input the sliding gesture that slides toward the bottom to enter the page screenshot mode. If the side by side three fingers are used to press the touch screen for a certain period of time, then it is determined whether to enter the area screenshot mode or the long screenshot mode according to the end point of sliding operation. Therefore, the operation modes of different screenshot modes are relevant, which makes the user's operation more convenient and improves the user experience.

Figure 20:
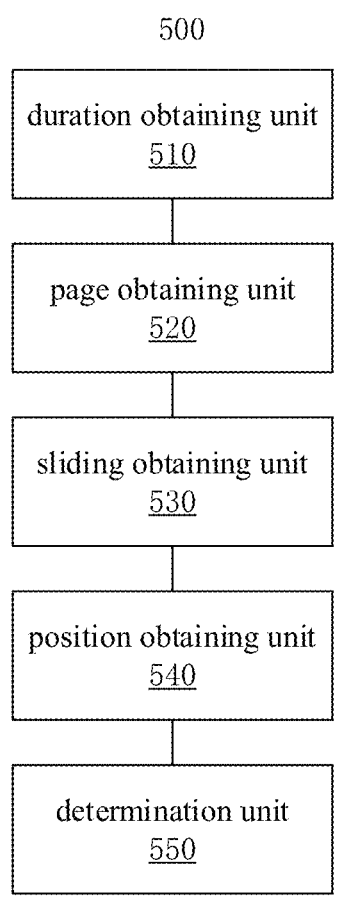
FIG. 20 shows a module block view of a screenshot device according to an embodiment of the present disclosure.

Please refer to FIG. 20, which shows a structural block view of a screenshot device 500 provided by the embodiments of the present disclosure. The device can include a duration obtaining unit 510, a page obtaining unit 520, a sliding obtaining unit 530, a position obtaining unit 540 and a determination unit 550.

The duration obtaining unit 510 is configured to obtain a duration of a pressing operation when the pressing operation acting on the touch screen is detected.

The page obtaining unit 520 is configured to determine a page to be screenshot currently displayed on the touch screen, when the duration reaching a preset duration is determined.

The sliding obtaining unit 530 is configured to obtain a sliding operation acting on the touch screen, wherein the sliding operation and the pressing operation are successive operations.

The position obtaining unit 540 is configured to obtain a positional relationship between an end point of the sliding operation and the page to be screenshot, when the sliding operation ends.

The determination unit 550 is configured to determine a screenshot image according to the positional relationship and the sliding operation, and capture the screenshot image.

Those skilled in the art can clearly understand that for the convenience and simplicity of the description, the specific working process of the above described device and module can refer to the corresponding process in the above described method embodiments, and will not be repeated here.

Figure 21:
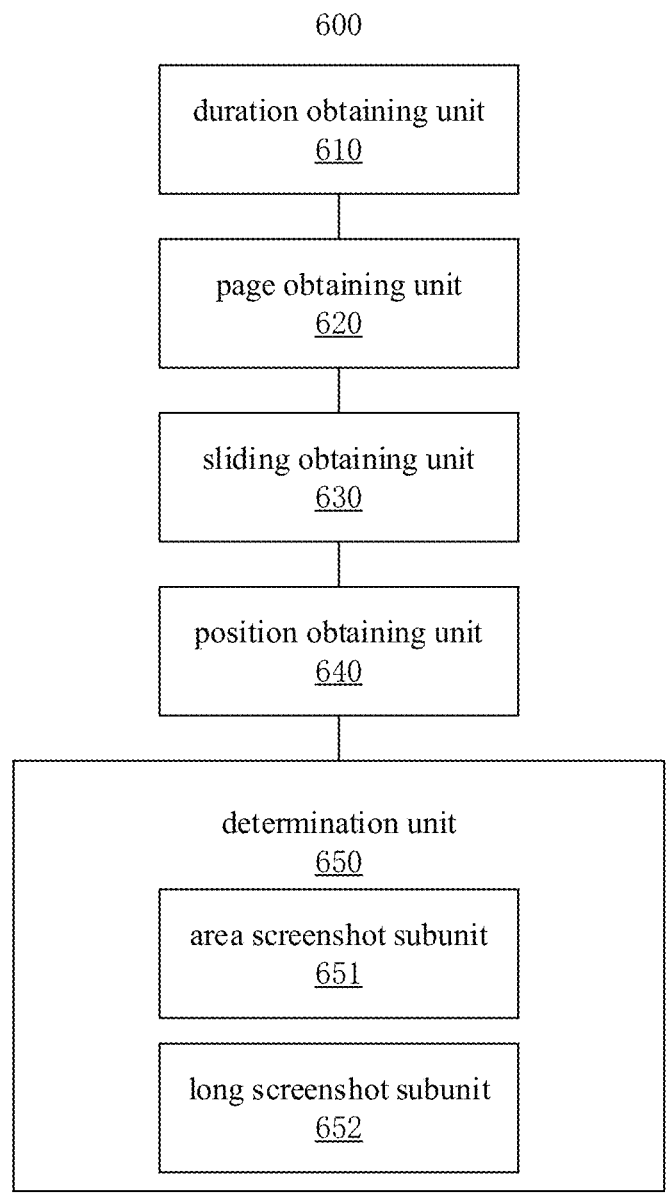
FIG. 21 shows a module block view of a screenshot device according to another embodiment of the present disclosure.

Please refer to FIG. 21, which shows the structural block view of a screenshot device 600 provided by the embodiments of the present disclosure. The device can include a duration obtaining unit 610, a page obtaining unit 620, a sliding obtaining unit 630, a position obtaining unit 640 and a determination unit 650.

The duration obtaining unit 610 is configured to obtain a duration of a pressing operation when the pressing operation acting on the touch screen is detected.

The page obtaining unit 620 is configured to determine a page to be screenshot currently displayed on the touch screen, when the duration reaching a preset duration is determined.

Specifically, the page obtaining unit 620 is also configured to reduce the size of the page currently displayed on the touch screen and display the reduced page when the duration reaching the preset duration is determined, wherein the reduced page is the page to be screenshot currently displayed. Specifically, the size of the page currently displayed on the touch screen is reduced and the reduced page is displayed as a mask layer.

The sliding obtaining unit 630 is configured to obtain a sliding operation acting on the touch screen, wherein the sliding operation and the pressing operation are successive operations.

The position obtaining unit 640 is configured to obtain a positional relationship between an end point of the sliding operation and the page to be screenshot, when the sliding operation ends.

The determination unit 650 is configured to determine a screenshot image according to the positional relationship and the sliding operation, and capture the screenshot image.

The determination unit 650 includes an area screenshot subunit 651 and a long screenshot subunit 652.

The area screenshot subunit 651 is configured to enter an area screenshot mode when the positional relationship is that the end point is within a specified area, wherein the specified area is defined between the top and the bottom of the page to be screenshot; determine a first position point in the page to be screenshot corresponding to a starting point of the sliding operation, and a second position point in the page to be screenshot corresponding to the end point of the sliding operation, under the area screenshot mode; and determine the screenshot image according to the first position point and the second position point.

The sliding obtaining unit 630 is specifically configured to display a selection box at the first position; obtain the sliding operation acting on the touch screen; and control a specified boundary line of the selection box to move as a touch point of the sliding operation moves.

The area screenshot subunit 651 is specifically configured to determine an area selected by the selection box in the page to be screenshot, when the specified boundary line of the selection box is moved from the first position point to the second position point; and take an image in the area selected by the selection box in the page to be screenshot as the screenshot image. Specifically, the operation of taking an image in the area selected by the selection box in the page currently as the screenshot image includes obtaining a modification instruction of the selection box area input by a user; modifying a size of the selection box according to the modification instruction of the selection box area; taking the image in the area selected by the modified selection box in the page to be screenshot as the screenshot image.

Wherein, the selection box is a rectangular box, a long side of the selection box is consistent with a width of the page, and the specified boundary line of the selection box is the long side of the selection box near the bottom or the top of the touch screen.

The long screen capture subunit 652 is configured to enter a long screenshot mode and taking the page to be screenshot as a starting page, when the positional relationship is that the end point is outside a specified area, wherein the specified area is the area between the top and the bottom of the page to be screenshot; determine an end position point inputted by a user in a final page after the start page under the long screenshot mode; and determine the screenshot image according to the end position point. Specifically, the operation of determining the screenshot image according to the end position point includes determining a starting position point in the starting page corresponding to a starting point of the sliding operation, and taking all images between the starting position point in the starting page and the end position point in the final page as the screenshot image.

Wherein, the pressing operation refers to a preset number of fingers pressing the touch screen side by side, the number of touch points of the sliding operation is consistent with the preset number, and the sliding operation refers to the preset number of fingers sliding on the touch screen side by side.

Those skilled in the art can clearly understand that for the convenience and simplicity of the description, the specific working process of the device and module described above can refer to the corresponding process in the above described method embodiments, and will not be repeated here.

In the several embodiments provided by the present disclosure, the coupling between the modules may be electrical, mechanical or other forms of coupling.

In addition, all functional modules in each embodiment of the present disclosure can be integrated into one processing module, or each module can exist independently physically, or two or more modules can be integrated into one module. The above integrated module can be implemented either in the form of hardware or in the form of software function modules.

Figure 22:
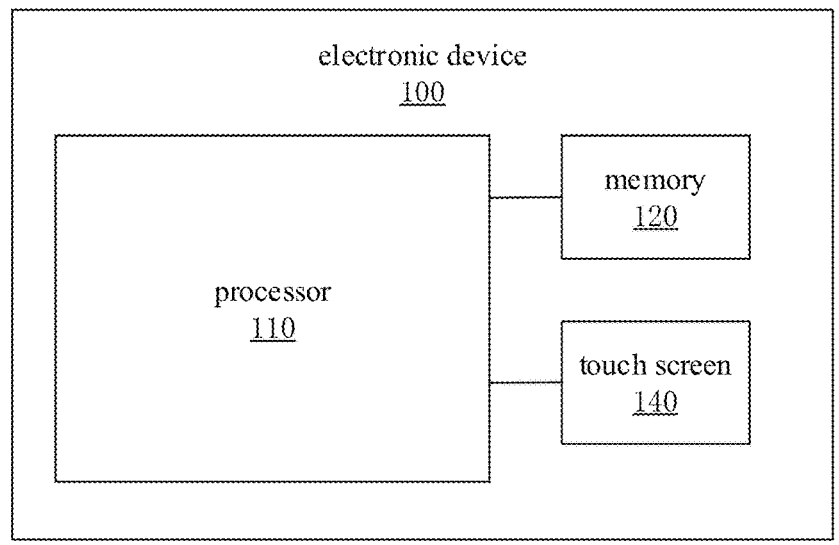
FIG. 22 shows a block view of an electronic device according to an embodiment of the present disclosure.

Please refer to FIG. 22, which shows a structural block view of the electronic device provided by the embodiments of the disclosure. The electronic device 100 can be an electronic device capable of running application programs, such as a smart phone, a tablet computer, or an e-book. The electronic device 100 of the present disclosure can include one or more of the following components: a processor 110, a memory 120, a touch screen 140, and one or more application programs. Wherein, the one or more application programs can be stored in the memory 120 and configured to be executed by one or more processors 110, and the one or more application program are configured to configurated to execute the method as described in the forgoing method embodiments.

The processor 110 can include one or more processing cores. The processor 110 uses various interfaces and lines to connect various parts of the entire electronic device 100, and performs various functions and processes data of the electronic device 100 by running or executing instructions, programs, code sets or instruction sets stored in the memory 120, and calling the data stored in the memory 120. Optionally, the processor 110 may be implemented in at least one hardware form of digital signal processing (DSP), field programmable gate array (FPGA), and programmable logic array (PLA). The processor 110 can integrate one or a combination of a central processing unit (CPU), a graphics processing unit (GPU) and a modem. Wherein, the CPU mainly deals with the operating system, user interface and application programs, the GPU is used for rendering and drawing the displayed content, and the modem is used for wireless communication. It can be understood that the modem described above can also be realized by a single communication chip without being integrated into the processor 110.

The memory 120 can include random access memory (RAM) and may also include read-only memory (ROM). The memory 120 can be used to store instructions, programs, codes, code sets, or instruction sets. The memory 120 can include a storage program area and a storage data area, wherein the storage program area can store instructions for implementing an operating system, instructions for implementing at least one function (such as a touch function, a sound playing function, an image playing function, and the like), and instructions for implementing embodiments of the above methods, and so on. The storage data area can also store data (such as phonebook, audio and video data, chat history data) created by the electronic device 100 during use.

Figure 23:
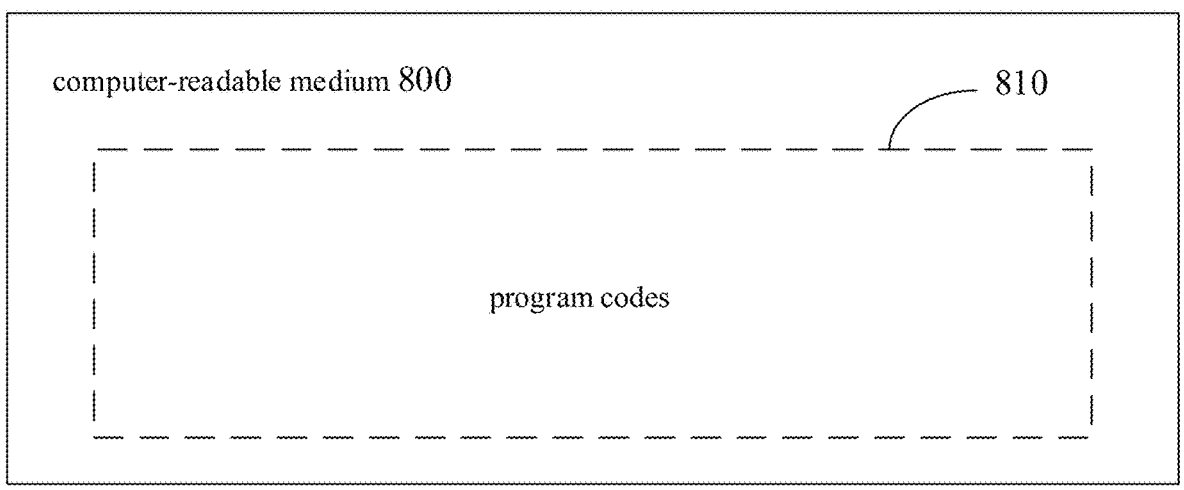
FIG. 23 shows the storage unit for storing or carrying program code implementing the screenshot capturing method according to the embodiments of the present disclosure.

Please refer to FIG. 23, which shows a block view of a computer-readable storage medium provided by the embodiments of the present disclosure. The computer-readable medium 800 stores program code which can be invoked by the processor to execute the method described in the above method embodiments.

The computer-readable medium 800 can be an electronic memory such as a flash memory, an EEPROM (electrically erasable programmable read only memory), an EPROM, a hard disk, or a ROM. Optionally, the computer-readable medium 800 includes a non-transitory computer-readable storage medium. The computer-readable medium 800 has a storage space for program codes 810 that performs any of the method steps in the described above methods. These program codes can be read from or written to one or more computer program products. The program codes 810 may be compressed, for example, in a suitable form.

Finally, it should be noted that the above embodiments are only used to describe the technical solution of the present disclosure, and are not to limit thereto. Although the disclosure has been described in detail with reference to the above embodiments, those of ordinary skill in the art should understand that they can still modify the technical solutions described in the above embodiments, or equivalently replace some of the technical features; and these modification or replacements do not drive the essence of the corresponding technical solution from the spirit and scope of the technical solutions of the embodiments of the present disclosure.

What is claimed is:

1. A screenshot capturing method, applied to an electronic device comprising a touch screen, the method comprising:
in response to detecting a pressing operation acting on the touch screen and corresponding to three touch points, determining whether a distance between every two adjacent touch points in the three touch points is less than a specified distance;
obtaining a duration of the pressing operation when determining that the distance between every two adjacent touch points in the three touch points is less than the specified distance;
determining a page currently displayed on the touch screen as a specified page in response to determining the duration reaches a preset duration;
obtaining a sliding operation acting on the touch screen, wherein the sliding operation and the pressing operation are successive operations;
obtaining a positional relationship between an end point of the sliding operation and the specified page, when the sliding operation ends; and
determining a screenshot image according to the positional relationship and the sliding operation, and capturing the screenshot image.

2. The method of claim 1, wherein the operation of determining a screenshot image according to the positional relationship and the sliding operation comprises:
entering an area screenshot mode when the positional relationship is that the end point is within a specified area, wherein the specified area is defined between a top and a bottom of the specified page;
determining a first position point in the specified page corresponding to a starting point of the sliding operation, and a second position point in the specified page corresponding to the end point of the sliding operation, under the area screenshot mode; and
determining the screenshot image according to the first position point and the second position point.

3. The method of claim 2, wherein the operation of obtaining a sliding operation acting on the touch screen comprises:
displaying a selection box at the first position point;
obtaining the sliding operation acting on the touch screen; and
controlling a specified boundary line of the selection box to move as a touch point of the sliding operation moves;
wherein the operation of determining the screenshot image according to the first position point and the second position point comprises:
determining an area selected by the selection box in the specified page, when the specified boundary line of the selection box is moved from the first position point to the second position point; and
taking an image in the area selected by the selection box as the screenshot image.

4. The method of claim 3, wherein the selection box is a rectangular box, a long side of the selection box is consistent with a width of the page, and the specified boundary line of the selection box is the long side of the selection box near the bottom or the top of the touch screen.

5. The method of claim 3, wherein the operation of taking an image in the area selected by the selection box as the screenshot image comprises:
obtaining a modification instruction of the selection box area input by a user;
modifying a size of the selection box according to the modification instruction of the selection box area; and
taking the image in the area selected by the modified selection box as the screenshot image.

6. The method of claim 3, wherein the method further comprises:
masking an outer part of the selection box without masking an inner part of the selection box.

7. The method of claim 2, wherein the sliding operation corresponds to the three touch points, one of the three touch points which is closest to the top of the touch screen is determined as the first position point.

8. The method of claim 1, wherein the pressing operation refers to three fingers pressing the touch screen side by side, the number of touch points of the sliding operation is consistent with the number of the touch points of the pressing operation, and the sliding operation refers to the three fingers sliding on the touch screen side by side.

9. The method of claim 1, wherein the operation of determining a page currently displayed on the touch screen as a specified page in response to determining the duration reaches a preset duration comprises:
reducing a size of a page currently displayed on the touch screen and displaying the reduced page in response to determining the duration reaches the preset duration, wherein the reduced page is the specified page currently displayed.

10. The method of claim 9, wherein the operation of reducing a size of a page currently displayed on the touch screen and displaying the reduced page comprises:

reducing the size of the page currently displayed on the touch screen and displaying the reduced page size as a mask layer.

11. An electronic device, comprising:

one or more processors;

a memory;

a touch screen; and one or more application programs, wherein the one or more application programs are stored in the memory and configured to be executed by the one or more processors, and the one or more application program is configured to execute a screenshot capturing method, wherein the method comprises:

in response to detecting a pressing operation acting on the touch screen and corresponding to three touch points, determining whether a distance between every two adjacent touch points in the three touch points is less than a specified distance;

obtaining a duration of the pressing operation when determining that the distance between every two adjacent touch points in the three touch points is less than the specified distance;

determining a page currently displayed on the touch screen as a specified page in response to determining the duration reaches a preset duration;

obtaining a sliding operation acting on the touch screen, wherein the sliding operation and the pressing operation are successive operations;

obtaining a positional relationship between an end point of the sliding operation and the specified page, when the sliding operation ends;

entering an area screenshot mode to select a partial area of the page currently displayed on the touch screen to capture a screenshot image, when the positional relationship is that the end point is within a specified area, wherein the specified area is defined between a top and a bottom of the specified page; and entering a long screenshot mode to capture content displayed on more than one screen and generate an image, when the positional relationship is that the end point is outside the specified area.

12. A non-transitory computer-readable medium storing program codes, the program codes being invoked by a processor to execute a screenshot capturing method, wherein the method comprises:

in response to detecting, on a touch screen of an electronic device, a pressing operation corresponding to three touch points, determining whether a distance between every two adjacent touch points in the three touch points is less than a specified distance;

obtaining a duration of the pressing operation when determining that the distance between every two adjacent touch points in the three touch points is less than the specified distance;

determining a page currently displayed on the touch screen as a specified page in response to determining the duration of the pressing operation reaches a preset duration;

obtaining a sliding operation acting on the touch screen, wherein the sliding operation starts from the three touch points of the pressing operation;

obtaining a positional relationship between an end point of the sliding operation and the specified page, when the sliding operation ends; and acquiring a screenshot image according to the positional relationship and the sliding operation.

\* \* \* \* \*